(12) United States Patent
Araujo et al.

(10) Patent No.: US 10,094,193 B2
(45) Date of Patent: Oct. 9, 2018

(54) BLOWOUT PREVENTER WITH RAM PACKER ASSEMBLIES WITH SUPPORT MEMBER

(71) Applicant: Cameron International Corporation, Houston, TX (US)

(72) Inventors: Raul Araujo, Cypress, TX (US); Jeff Lambert, Tomball, TX (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 14/879,498

(22) Filed: Oct. 9, 2015

(65) Prior Publication Data

US 2017/0101841 A1   Apr. 13, 2017

(51) Int. Cl.
  *E21B 33/06*   (2006.01)
  *B29C 45/14*   (2006.01)

(52) U.S. Cl.
  CPC ............ *E21B 33/062* (2013.01); *B29C 45/14* (2013.01)

(58) Field of Classification Search
  CPC ...... E21B 33/06; E21B 33/061; E21B 33/062; E21B 33/063; E21B 33/1208; Y10T 428/24331; B29C 45/14
  USPC ........... 251/1.1, 1.2, 1.3; 166/85.4; 277/325, 277/341, 338, 328, 327; 264/261
  See application file for complete search history.

(56) References Cited

U.S. PATENT DOCUMENTS

| | | | |
|---|---|---|---|
| 3,959,429 A * | 5/1976 | Benning | A61M 25/1034 264/155 |
| 4,518,144 A * | 5/1985 | Vicic | E21B 33/062 251/1.3 |
| 4,703,938 A | 11/1987 | Fox | |
| 5,294,088 A * | 3/1994 | McWhorter | E21B 33/062 251/1.3 |
| 5,333,832 A * | 8/1994 | Bartholomew | E21B 33/062 251/1.1 |
| 5,944,110 A * | 8/1999 | Watts | E21B 33/062 166/320 |
| 6,089,526 A | 7/2000 | Olson | |
| 6,394,460 B1 | 5/2002 | Leggett et al. | |
| 2004/0079909 A1* | 4/2004 | Foster | E21B 33/062 251/1.3 |
| 2013/0097836 A1 | 4/2013 | Hoover et al. | |

OTHER PUBLICATIONS

International Search Report and Written Opinion of PCT Application No. PCT/US2016/053712 dated Jan. 2, 2017: pp. 1-16.
International Preliminary Report on Patentability for the equivalent International patent application PCT/US2016/053712 dated Apr. 19, 2018.

* cited by examiner

*Primary Examiner* — Craig J Price
*Assistant Examiner* — Andrew J Rost
(74) *Attorney, Agent, or Firm* — Helene Raybaud

(57) ABSTRACT

A blowout preventer ("BOP") includes a housing comprising a vertical bore extending through the housing and ram cavities intersecting the bore and ram assemblies, each ram assembly movably positionable within a ram cavity. Each ram assembly includes a packer assembly that comprises an upper plate, a lower plate, an elastomeric body positioned between the upper plate and the lower plate and comprising elastomeric material, and a support member comprising an aperture and positioned between the upper plate and the lower plate to provide support to the ram assembly.

18 Claims, 4 Drawing Sheets

BLOWOUT PREVENTER WITH RAM PACKER ASSEMBLIES WITH SUPPORT MEMBER

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

Blowout preventers (BOPS) are used extensively throughout the oil and gas industry. Typical BOPs are used as a large specialized valve or similar mechanical device that seal, control, and monitor oil and gas wells. The two categories of BOPs that are most prevalent are ram BOPs and annular BOPs. Blowout preventer stacks frequently utilize both types of BOPs, typically with at least one annular BOP stacked above several ram BOPs. The ram units in ram BOPs allow for shearing drill pipe in the case of shear rams, and sealing off around drill pipe in the case of pipe rams. Typically, a BOP stack may be secured to a wellhead and may provide a safe means for sealing the well in the event of a system failure.

An example ram BOP includes a main body or housing with a vertical bore. Ram bonnet assemblies may be bolted to opposing sides of the main body using a number of high tensile fasteners, such as bolts or studs. These fasteners are required to hold the bonnet in position to enable the sealing arrangements to work effectively. An elastomeric sealing element may be used between the ram bonnet and the main body. There are several configurations, but essentially they are all directed to preventing a leakage bypass between the mating faces of the ram bonnet and the main body. Each bonnet assembly includes a piston which is laterally movable within a ram cavity of the bonnet assembly by pressurized hydraulic fluid acting on one side of the piston. The opposite side of each piston has a connecting rod attached thereto which in turn has a ram mounted thereon. The rams can be pipe rams for sealing off around an object within the bore of a BOP, such as a pipe, thereby sealing the annular space between the object and the BOP bore.

The rams are designed to move laterally toward the vertical bore of the BOP to shear or seal off on any object located therein. For instance, opposing pipe rams utilize seals that close in on and seal off on a tubular within the vertical bore of the BOP, such as a section of drill pipe used during drilling operations. Each pipe ram typically has a semicircular opening in its front face to form a seal about half of the outer periphery of the object within the BOP vertical bore. When the opposing pipe rams are closed, the opposing pipe rams engage each other and seal the entire periphery of the object, thereby closing off the annulus between the object and the BOP bore. Typical pipe ram assemblies can include a ram packer that is composed of an elastomeric or rubber material configured to seal off against the tubular within the vertical bore of the BOP when the opposing rams are run into the closed position. However, in certain embodiments, the elastomeric material may become damaged when the rams are moving within the BOP housing and sealing upon objects within the BOP bore, such as by having the elastomeric material extrude and clipped or cut off when sealing and/or moving within the BOP.

DESCRIPTION OF THE DRAWINGS

For a detailed description of the preferred embodiments of the present disclosure, reference will now be made to the accompanying drawings in which.

DETAILED DESCRIPTION

Figure 1:
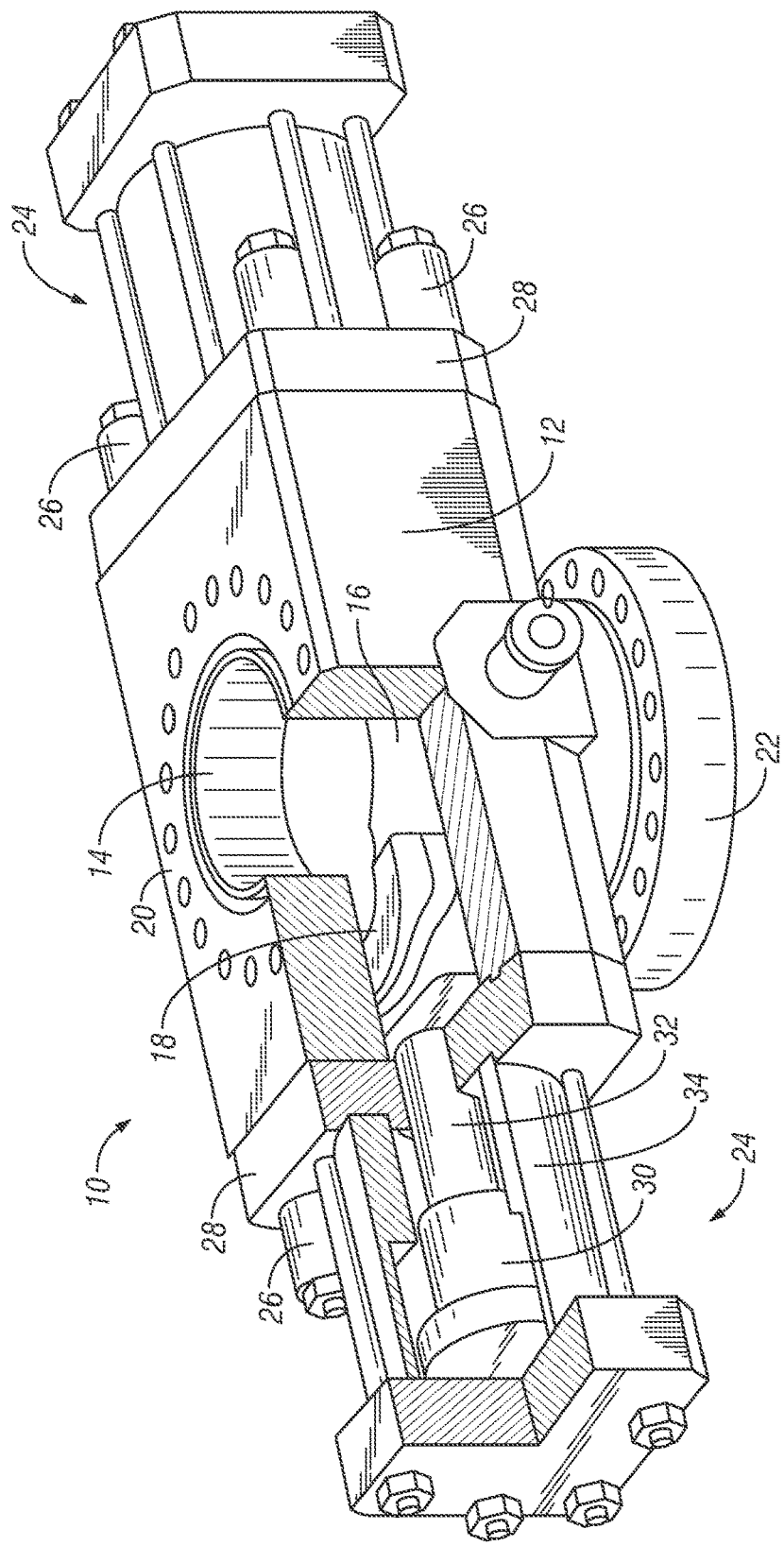
FIG. 1 is a sectional view of a pipe ram BOP in accordance with one or more embodiments of the present disclosure.

The following discussion is directed to various embodiments of the present disclosure. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed below may be employed separately or in any suitable combination to produce desired results. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but are the same structure or function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. The use of "top," "bottom,"

"above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Referring now to FIG. 1, a sectional view of a pipe ram BOP 10 is shown for illustrative purposes. The BOP 10 includes a housing 12, such as a hollow body, with a vertical bore 14 that enables passage of fluid or an object, such as a tubular member, through the BOP 10. The housing 12 further includes one or more cavities, such as ram cavities 16 opposed from each other with respect to the vertical bore 14, with a pipe ram assembly 18 (e.g., ram) movably positioned within each cavity 16. The BOP 10 may be coupled to other equipment that facilitates natural resource production. For instance, production equipment or other components may be attached to the top of the BOP 10 using a connection 20 (which may be facilitated in the form of fasteners), and the BOP 10 may be attached to a wellhead, spool, or other equipment using the flange 22 and additional fasteners.

One or more bonnet assemblies 24 are secured to the housing 12 and include various components that facilitate control of the ram assemblies 18 positioned in the BOP 10. The bonnet assemblies 24 are coupled to the housing 12 by using one or more fasteners 26 to secure the bonnets 28 of the bonnet assemblies 24 to the housing 12. The ram assemblies 18 are then actuated and moved through the cavities 16, into and out of the bore 14, by operating and moving a piston 30 and a rod 32 coupled thereto within a housing 34 of the bonnet assemblies 24.

In operation, a force (e.g., from hydraulic pressure) may be applied to the pistons 30 to drive the rods 32, which in turn drives the rams 18 coupled thereto into the bore 14 of the BOP 10. The ram assemblies 18 cooperate with one another when driven together to seal the bore 14 and inhibit flow through the BOP 10.

In this embodiment, a hydraulic actuator is shown, though any type of actuator (e.g., pneumatic, electrical, mechanical) may be used in accordance with the present disclosure. As such, this embodiment may include a piston 30 and a rod 32 connecting the piston 30 to the ram assembly 18. Further, pressurized fluid may be introduced and fluidly communicated on opposite sides of the piston 30 thereby enabling the piston 30 to move the ram assembly 18 in response to fluid pressure.

Figure 2:
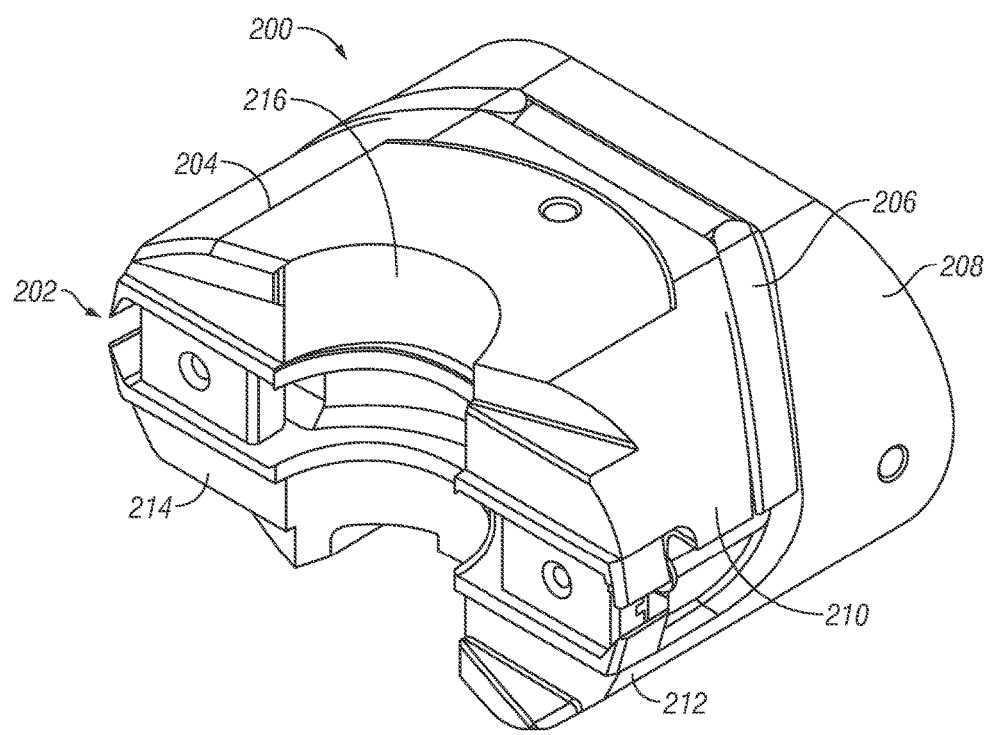
FIG. 2 is a perspective view of a ram assembly including a packer assembly in accordance with one or more embodiments of the present disclosure.

Turning now to FIG. 2, a perspective view of a ram assembly 200 including a packer assembly 202 in accordance with one or more embodiments of the present disclosure is shown. For illustrative purposes only, the packer assembly 202 is shown here without any elastomeric material. The ram assembly 200 includes a ram body 204, a top seal 206, and the packer assembly 202. The ram body 204 generally includes rounded sides 208 and fits laterally in the ram cavities of a BOP, such as the ram cavities 16 illustrated in FIG. 1.

The ram body 204 includes an upper body 210 and a lower body 212 with a front face 214 extending between the bodies 210 and 212 to define a packer assembly cavity. In the illustrated embodiment, the packer assembly 202 is inserted within the packer assembly cavity. Formed within the front face 214 and the bodies 210 and 212 of the ram body 204 is a pipe ram bore profile 216. The ram bore profile 216 is substantially semi-circularly shaped and extends vertically through the upper body 210, the lower body 212, and the packer assembly 202.

Figure 3:
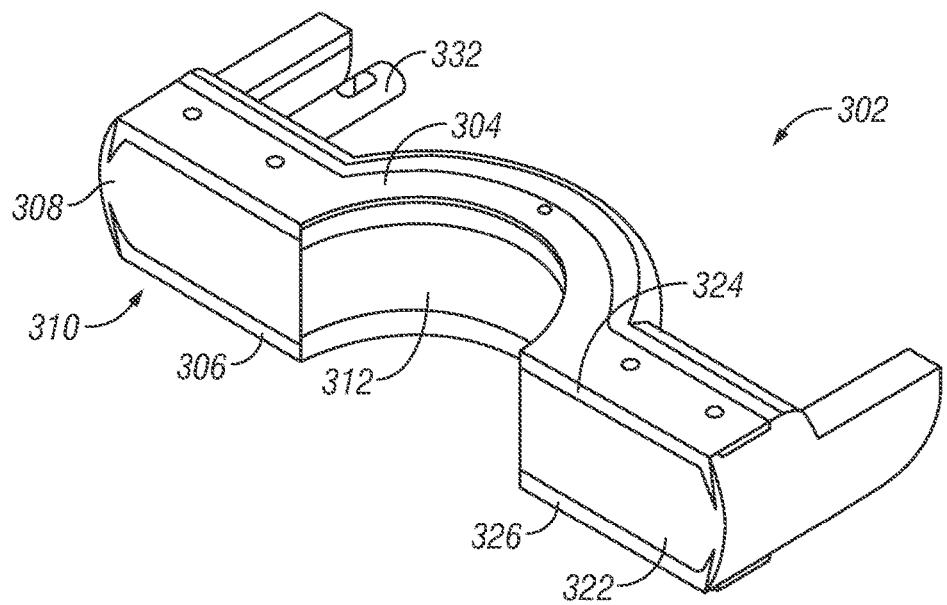
FIG. 3 is a perspective view of packer assembly including an elastomeric body in accordance with one or more embodiments of the present disclosure.
Figure 4:
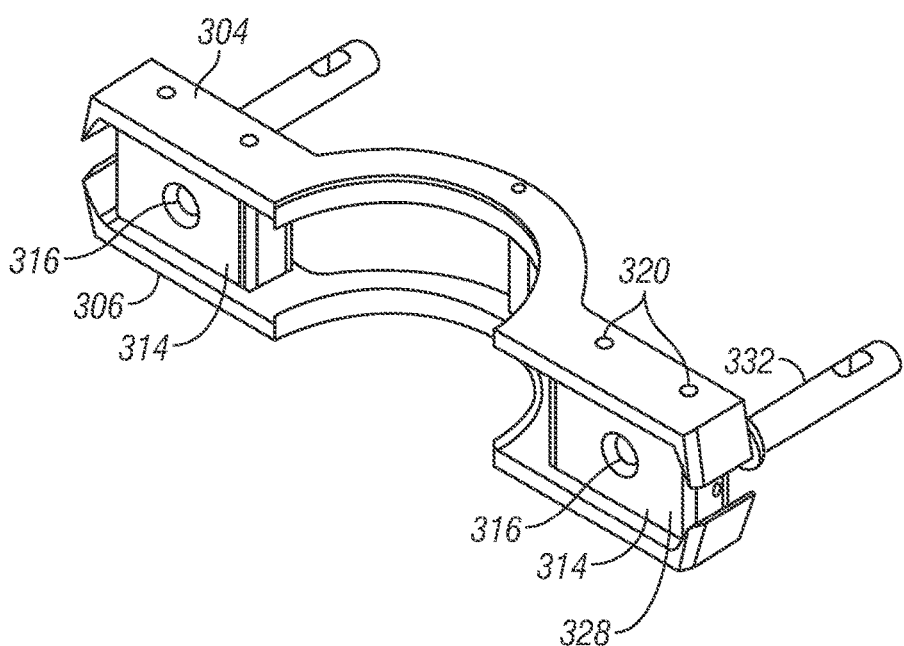
FIG. 4 is a perspective view of packer assembly including a support member in accordance with one or more embodiments of the present disclosure.
Figure 5:
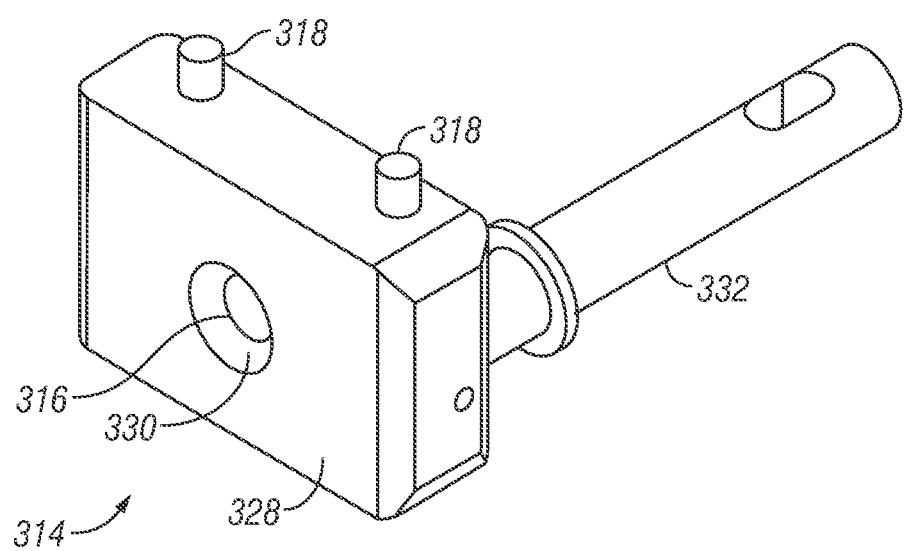
FIG. 5 is a perspective view of a support member in accordance with one or more embodiments of the present disclosure.

Referring now to FIGS. 3-5, multiple views of a packer assembly 302 and components thereof in accordance with one or more embodiments of the present disclosure is shown. In particular, FIG. 3 shows a perspective view of the packer assembly 302, FIG. 4 shows a perspective view of the packer assembly 302 without any elastomeric material for illustrative purposes, and FIG. 5 shows a perspective view of a support member 314. The packer assembly 302 is similar to packer assembly 202 illustrated in FIG. 2.

The packer assembly 302 includes an upper plate 304 and a lower plate 306. Elastomeric material 308 is then positioned or molded between the upper plate 304 and the lower plate 306. In particular, a packer assembly body 310 that includes the elastomeric material 308 is molded or positioned to extend between the upper plate 304 and the lower plate 306. The elastomeric material 308 may include any type of elastomer, such as any synthetic or natural rubber or combination thereof. The body 310 can be molded in any desired shape, such as semi-elliptical shape as shown, or an elliptical, circular, or any other type of shape. Further, in this embodiment, as the packer assembly 302 may be used within a ram BOP, the packer assembly 302 includes a packer pipe or bore profile 312 formed as a curved surface extending through the upper plate 304, the lower plate 306, and the body 310.

In accordance with one or more embodiments, one or more support members 314 are positioned between the upper plate 304 and the lower plate 306. The support members 314 provide support to the ram assembly (e.g., 200), particularly when experiencing loads from equipment (e.g., when equipment hangs-off from the ram assembly within the BOP (discussed more below)). Further, the support members 314 include an aperture 316 to at least partially receive elastomeric material 308. For example, the elastomeric material 308 may flow or extrude into the aperture 316 to relieve stress on the elastomeric material 308 when the ram assemblies close upon an object. Otherwise, the elastomeric material 308 may flow in other directions (e.g., towards the sides, top, or bottom of the packer assembly 302). The support members 314 are each shown in these figures to only include one aperture 316. However, in other embodiments, the support members 314 may each include more than one aperture 316.

The support members 314 extend between the upper plate 304 and the lower plate 306, and may be removably coupled to the upper plate 304 and/or the lower plate 306. For example, the support members 314 may each include one or more dowels 318 that are received within corresponding holes 320 of the upper plate 304 and the lower plate 306. This engagement may hold the support members 314 in place with respect to the upper plate 304 and/or the lower plate 306, such as when forming or molding the packer assembly 302 together. Further, this engagement may facilitate having the support members 314 provide support to the ram assembly and transfer loads across the ram assembly within the BOP.

The support members 314, as shown, may be recessed with respect to a front face 322 of the elastomeric material 308 or body 310. For example, the body 310 has a front face 322 that is defined and extends between a front face 324 of the upper plate 304 and a front face 326 of the lower plate 306. The support members 314 may then be recessed back or away from the front face 322 of the body 310, such as by about 0.5 inches (about 1.3 cm), to support the elastomeric material 308.

The support members 314 may be formed as support blocks, as shown. The support members 314 each include a front planar face 328 with the aperture 316 formed within the front face 328. The apertures 316 may be formed to extend all the way through the support members 314. Alternatively, the apertures 316 may only extend partially through the support members 314. Further, to facilitate the flow of the elastomeric material 308 into the apertures 316, the apertures 316 may include an enlarged transitional opening 330. For example, as best shown in FIG. 5, an enlarged transitional opening 330, such as a tapered or curved opening, may be formed at the entrance of the aperture 316. Furthermore, the support members 314 may each include an attachment member 332, such as an attachment arm extending from a back side of the support members 314. The attachment members 332 may be used to couple the packer assembly 302 to the ram of the BOP. In particular, and with reference to FIG. 2, when the packer assembly 302 within a packer assembly cavity of a ram body, the attachment members 332 may couple the packer assembly 302 to the top seal 206 to secure the packer assembly 302 to the ram 200.

As mentioned above, the packer assembly 302 includes one or more support members 314. In the embodiment shown in FIG. 4, the packer assembly 302 includes two support members 314 with the support members 314 positioned on opposite sides of the packer bore profile 312 with respect to each other. In particular, one support member 314 is positioned adjacent one end of the upper plate 304 and the lower plate 306, and the other support member 314 is positioned adjacent the other end of the upper plate 304 and the lower plate 306.

The packer assembly 302 may be used to seal about an object located within a vertical bore of a BOP when the packer assembly 302 is moved to a closed position. In particular, in this embodiment, the packer assembly 302 seals about 180° of an object to be sealed upon within a BOP. A corresponding packer assembly also closes on the object from the opposing side and seals about the other 180° of the object. Exemplary objects to be sealed upon include a drill pipe joint, a casing joint, and a tool joint. In this way, the packer assembly 302, together with a corresponding and opposing packer assembly run from an opposing side, provides for a fluid seal in the annular region between an object in a BOP borehole and the BOP housing. Accordingly, the above embodiments are discussed with respect to a pipe ram BOP.

An embodiment in accordance with the present disclosure may include one or more of the following advantages. In one embodiment, a packer assembly in accordance with the present disclosure may enable a ram assembly and/or a BOP to be able to support heavier loads of tubular members or equipment. For example, a packer assembly including support members in accordance with the present disclosure may be able to increase the hang-off capacity of a ram BOP. A pipe ram BOP may be used to have equipment hang-off the ram assemblies, such as by having a tool joint (e.g., drill pipe) rest on top of the ram assemblies with drill pipe then hanging-off from the ram assemblies when the ram assemblies have been closed around the drill pipe within the pipe ram BOP. Accordingly, in one or more embodiments, a packer assembly in accordance with the present disclosure may increase the hang-off capacity of a ram assembly and a ram BOP from about 600,000 lbs (about 272,000 kgs) and up to about 1,500,000 lbf (about 680,400 kg-force). The support members may be used to facilitate transferring hang-off loads from the upper portion to the lower portion of the ram assembly (e.g., from the upper body 210 to the lower body 212) across the packer assembly cavity, with the hang-off load in turn being transferred from the ram assembly to the ram BOP body. This may facilitate preventing having the upper body of the ram assembly deflect with respect to the lower body across the packer assembly of the ram assembly, particularly when the ram assembly is used to support hang-off loads.

In one or more embodiments, a mold may be used when manufacturing a packer assembly for a ram BOP. For example, a mold may be formed having the desired dimensions for the packer assembly. The upper plate, the lower plate, and the one or more support members are assembled and inserted into the mold. The elastomeric material is then injected into the mold with the elastomeric material cured to form the packer assembly. Place holders may be insert into the apertures of the support members to prevent the elastomeric material from entering the apertures when forming the packer assembly. For example, a plug, or some type of wax or other removable material or component may be positioned within the apertures, with the elastomeric material then injected into the mold. The place holders may then be removed after the packer assembly has been formed, such as by removing the place holders through the back side of the support members. The support member 314 can be incorporated into the packer assemblies of newly manufactured ram assemblies. Alternatively, the support member 314 can be molded into a packer assembly and retrofitted to an existing ram assembly. In this way, older and already existing ram assemblies can be retrofitted to extend the life of the ram assemblies.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of manufacturing a packer assembly for a ram assembly of a BOP, the method comprising:
    providing a mold with desired dimensions for the packer assembly;
    inserting an upper plate, a lower plate, and support members, each support member comprising an aperture, into the mold such that the support members are positioned between the upper plate and the lower plate and on opposite sides of a pipe profile of the upper plate and the lower plate with respect to each other;
    injecting an elastomeric material into the mold; and
    curing the elastomeric material to form the packer assembly such that the aperture is unfilled by the elastomeric material to enable the aperture to receive a portion of the elastomeric material in the aperture when the packer assembly contacts and forms a seal against a pipe in use.

2. The method of claim 1, further comprising:
    inserting a place holder into the aperture before injecting the elastomeric material into the mold to prevent elastomeric material from entering the aperture when forming the packer assembly.

3. A blowout preventer ("BOP"), comprising:
a housing comprising a vertical bore extending through the housing and ram cavities intersecting the bore;
ram assemblies, each ram assembly movably positionable within a ram cavity, each ram assembly comprising a packer assembly comprising:
an upper plate and a lower plate, each comprising a pipe profile formed therein;
an elastomeric body positioned between the upper plate and the lower plate and comprising elastomeric material; and
support members positioned on opposite sides of the pipe profile with respect to each other, each support member comprising an aperture that is unfilled by the elastomeric material during manufacturing to enable the aperture to receive a portion of the elastomeric material as the ram assembly moves to a closed position in which the ram assembly forms a seal against a pipe when in use, the support members positioned between the upper plate and the lower plate to provide support to the ram assembly.

4. The BOP of claim 3, wherein the support members are configured to increase a hang-off capacity for the ram assembly up to about 1,500,000 lbf (about 680,400 kg-force).

5. The BOP of claim 3, wherein the support member comprises a front planar surface configured to face the vertical bore when in use, the front planar surface is a closest surface of the support member relative to the vertical bore when in use, and the aperture is formed in the front planar surface of the support member.

6. The BOP of claim 5, wherein the support member comprises a front planar face with the aperture formed within the front planar face.

7. The packer assembly of claim 6, wherein the support member comprises a support block.

8. The BOP of claim 3, wherein the aperture comprises an enlarged opening.

9. The BOP of claim 3, wherein the support member is removably coupled to at least one of the upper plate and the lower plate.

10. The BOP of claim 9, further comprising a dowel that is receivable within a hole to removably couple the support member to the at least one of the upper plate and the lower plate.

11. The BOP of claim 3, wherein the support member comprises an attachment member configured to removably couple the packer assembly to the ram.

12. The BOP of claim 3, wherein the upper plate, the lower plate, and the elastomeric body each comprise a curved inner surface.

13. A packer assembly for a ram assembly of a blowout preventer ("BOP"), the packer assembly comprising:
an upper plate and a lower plate, each comprising a pipe profile formed therein;
a body comprising an elastomeric material that is positioned between the upper plate and the lower plate; and
support members positioned on opposite sides of the pipe profile with respect to each other, each support member comprising an aperture that is unfilled by the elastomeric material during manufacturing to enable the aperture to receive a portion of the elastomeric material as the ram assembly moves to a closed position in which the ram assembly forms a seal against a pipe when in use, the support member positioned between the upper plate and the lower plate to provide support to the ram assembly.

14. The packer assembly of claim 13, wherein the support members are configured to increase a hang-off capacity for the ram assembly up to about 1,500,000 lbf (about 680,400 kg-force).

15. The packer assembly of claim 13, wherein the support member comprises a front planar surface configured to face a vertical bore of the ram assembly when in use, the front planar surface is a closest surface of the support member relative to the vertical bore when in use, and the aperture is formed in the front planar surface of the support member.

16. The packer assembly of claim 13, wherein the support member comprises a support block including a front planar face with the aperture formed within the front planar face.

17. The packer assembly of claim 13, wherein the support member is removably coupled to at least one of the upper plate and the lower plate.

18. The packer assembly of claim 13, wherein the upper plate, the lower plate, and the elastomeric material each comprise a curved inner surface.

* * * * *